United States Patent [19]
Graf

[11] Patent Number: 5,900,120
[45] Date of Patent: May 4, 1999

[54] DRYING CYLINDER BEARING SUPPORT IN A PAPER-MAKING MACHINE

[75] Inventor: Edwin X. Graf, Menasha, Wis.

[73] Assignee: Voith Sulzer Paper Technology North America, Inc., Appleton, Wis.

[21] Appl. No.: 08/934,704

[22] Filed: Sep. 22, 1997

[51] Int. Cl.[6] .............................. D21F 5/02; F16C 31/00
[52] U.S. Cl. ...................... 162/290; 34/121; 384/535; 492/46; 162/375
[58] Field of Search .................... 162/290, 375; 34/121; 492/46; 384/535, 581, 215

[56] References Cited

U.S. PATENT DOCUMENTS

| | | |
|---|---|---|
| 3,359,646 | 12/1967 | Beachler .................................... 34/121 |
| 3,704,921 | 12/1972 | Skytta ....................................... 34/121 |
| 5,560,808 | 10/1996 | Graf ......................................... 162/209 |

*Primary Examiner*—Karen M. Hastings
*Attorney, Agent, or Firm*—Taylor & Associates, P.C.

[57] ABSTRACT

A paper making machine for the production of a fiber material web includes a drying cylinder, first and second bearing assemblies, a fixed rigid support, a fixed structure and a flexible device. The drying cylinder has two longitudinal ends, a longitudinal axis and at least one fluid passage for receiving heated fluid. Each bearing assembly is attached to and rotatably carries a respective longitudinal end of the drying cylinder. The fixed rigid support substantially immovably supports the second bearing assembly. The flexible device allows for longitudinal thermal expansion of the drying cylinder in a direction substantially parallel to the longitudinal axis of the drying cylinder. The flexible device carries the first bearing assembly and interconnects the first bearing assembly to the fixed structure.

11 Claims, 2 Drawing Sheets

DRYING CYLINDER BEARING SUPPORT IN A PAPER-MAKING MACHINE

BACKGROUND OF THE INVENTION

1. Field of the Invention

The present invention relates to a paper-making machine, and, more particularly, to a support for a drying cylinder bearing in a paper-making machine.

2. Description of the Related Art

A paper-making machine may be thought of as including various portions or sections along the running direction of the paper web through the machine. For example, the paper-making machine may include a wet end, a forming section, a press section and a dryer section. The dryer section receives a higher moisture content paper web and drys the paper web to a desired lower moisture content. The dryer section includes a plurality of heated drying cylinders which respectively engage and carry the paper web from the upstream end of the dryer section to the downstream end of the dryer section.

In order to heat up certain drying cylinders within such a dryer section of a paper-making machine, it is known to attach steam carrying pipes to these cylinders. Since the cylinders expand upon heating in all directions, especially along their longitudinal direction, i.e., along the axis about which the cylinder rotates in service, it is known to incorporate at least one bearing which rotatably carries the drying cylinder and provides room for some relative axial movement between the inner and outer races. The room for relative movement can compensate for the thermal expansion of the drying cylinder during operation. Thermal expansions along the longitudinal axis about which the cylinder rotates are accommodated by the bearing so that the fixed structure to which the drying cylinder is mounted will not be moved or deformed during operation. A problem is that such freely carrying bearings may require more frequent replacement than standard bearings because of the added wear caused by the axial movement. Another problem is that such freely carrying bearings are more expensive than standard bearings.

SUMMARY OF THE INVENTION

The present invention provides a flexible drying cylinder bearing support which allows for thermal expansion of the drying cylinder in the longitudinal direction.

The invention comprises, in one form thereof, a paper making machine for the production of a fiber material web including a drying cylinder, first and second bearing assemblies, a fixed rigid support, a fixed structure and a flexible device. The drying cylinder has two longitudinal ends, a longitudinal axis and at least one fluid passage for receiving heated fluid. Each bearing assembly is attached to and rotatably carries a respective longitudinal end of the drying cylinder. The fixed rigid support substantially immovably supports the second bearing assembly. The flexible device allows for longitudinal thermal expansion of the drying cylinder in a direction substantially parallel to the longitudinal axis of the drying cylinder. The flexible device carries the first bearing assembly and interconnects the first bearing assembly to the fixed structure.

An advantage of the present invention is that longitudinal thermal expansion of the drying cylinder can be inexpensively allowed for.

Another advantage is that standard bearings may be used on the drying cylinder.

Yet another advantage is that the non-movable parts of the present invention provide high durability and repairs are required less frequently.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
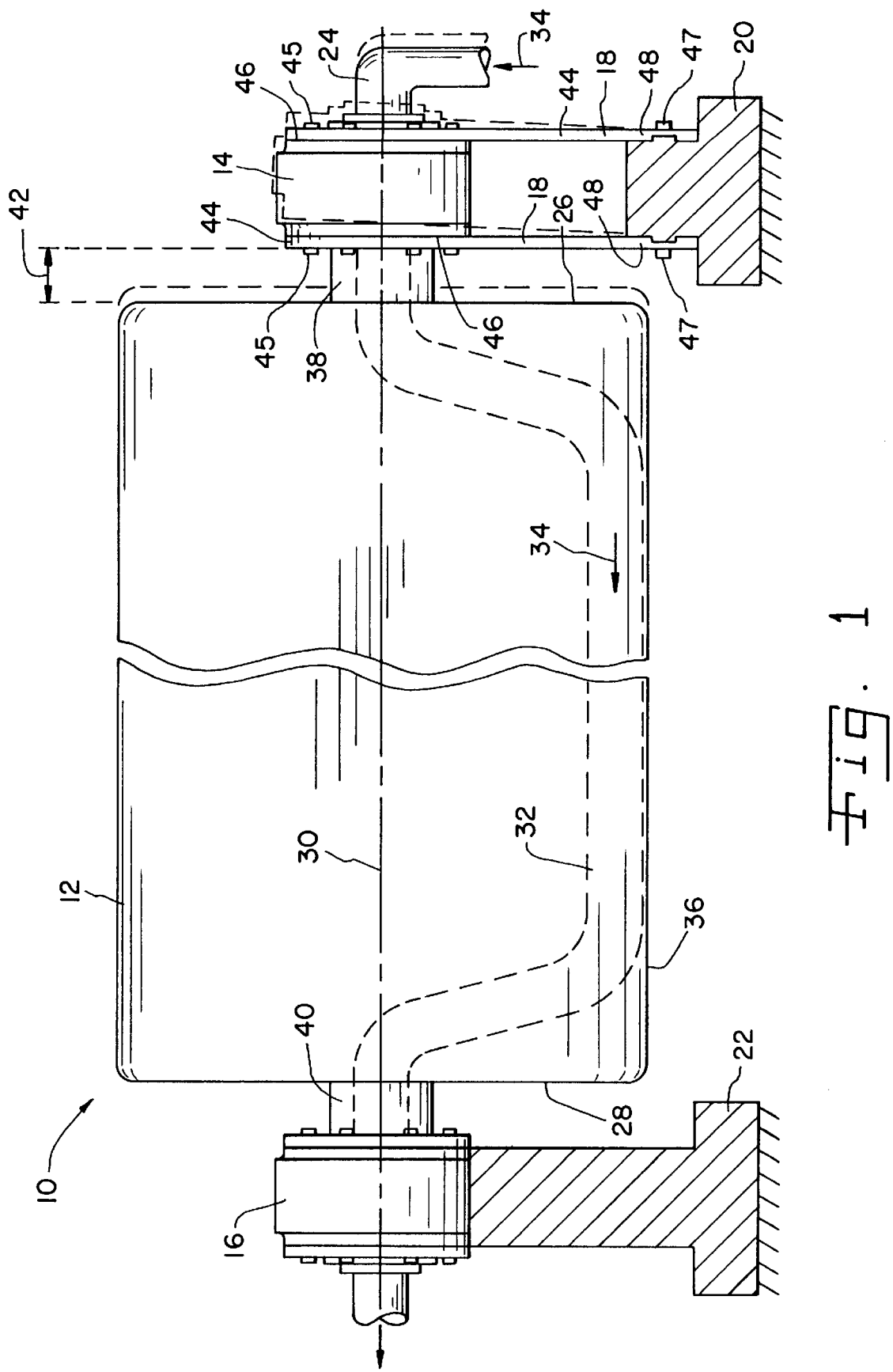
FIG. 1 is a schematic front view of an embodiment of a drying cylinder bearing support of the present invention.

Referring now to the drawings, and particularly to FIG. 1, there is shown a front view of one embodiment of a drying cylinder bearing support assembly 10 of the present invention. Drying cylinder bearing support assembly 10 generally includes a drying cylinder 12, bearing assemblies 14 and 16, elongate flexible plates 18, fixed structure 20, fixed rigid support 22 and a hot fluid supply pipe 24.

Rotatable drying cylinder 12, in the embodiment shown, is approximately 400 inches long and is formed of steel. Cylinder 12 rotates about a longitudinal axis of rotation 30 and is concentric with its two longitudinal ends 26 and 28. Cylinder 12 also includes an internal fluid passage 32 (indicated schematically) containing a flow of hot or super-heated fluid, such as steam, indicated by arrow 34. The flow of super-heated fluid can also be directed the other way, i.e., in a direction opposite to that of arrow 34. An outer surface 36 of cylinder 12 absorbs heat from the super-heated fluid. The heat from surface 36, in turn, increases the rate of water evaporation from a paper web (not shown), which is carried by outer surface 36 of cylinder 12. Fluid passage 32 is shown as being a single conduit through the length of cylinder 12. However, it is to be understood that fluid passage 32 can include multiple conduits, not all necessarily extending the entire length of roll 12. Fluid passage 32 can also include a plurality of fingers extending from a central conduit toward various areas of surface 36. Fluid passage 32 is shown as passing through each of a pair of shafts 38 and 40 projecting from respective longitudinal ends 26 and 28 of cylinder 12. Shafts 38 and 40 are also concentric around longitudinal axis 30.

Each bearing assembly 14 and 16 rotatably carries a respective shaft 38 or 40. Thus, each bearing assembly 14 and 16 is interconnected with, through a respective one of shafts 38 and 40, a respective longitudinal end 26 and 28 of cylinder 12. Each shaft 38 and 40 maintains each respective bearing assembly 14 and 16 at a substantially fixed distance 42 from a respective longitudinal end of cylinder 12. Each bearing assembly 14 and 16 is also concentric around longitudinal axis of rotation 30. Of course fluid passage 32 extends, too, through each of bearing assemblies 14 and 16. Any sort of friction reducing bearing can serve within either bearing assembly 14 or 16.

Figure 2:
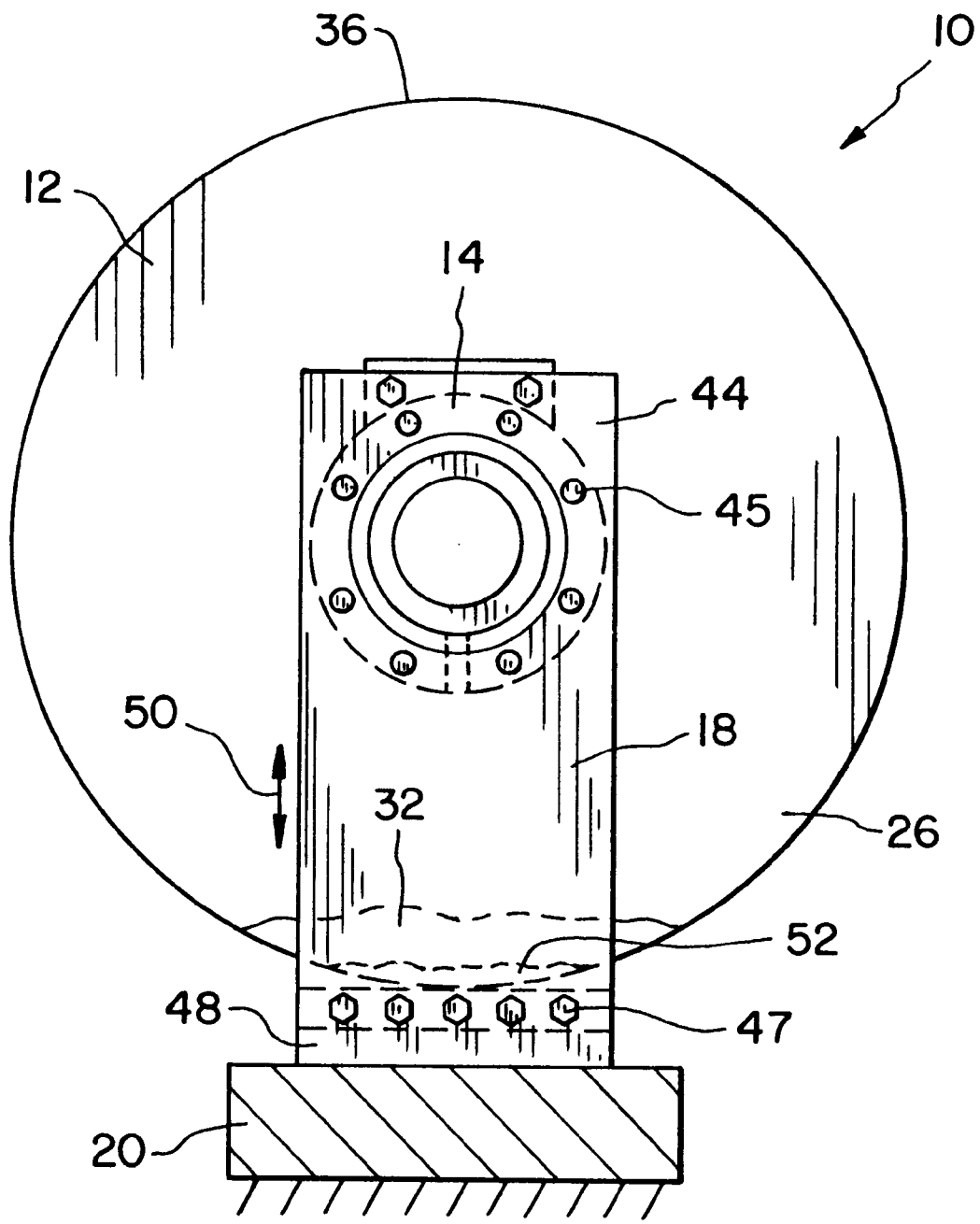
FIG. 2 is a side view of the drying cylinder bearing support shown in FIG. 1.

Elongate flexible plates 18 each include an upper end 44 rigidly attached to a respective one of opposite sides 46 of bearing assembly 14. Each flexible plate 18 also includes a lower end 48 rigidly attached to a fixed structure 20. For instance, plates 18 can be bolted to both bearing assembly 14 and fixed structure 20 using bolts 45 and 47, respectively. A longitudinal direction 50 (FIG. 2) of elongate flexible plates 18 extends transverse to longitudinal axis 30 of cylinder 12. Plates 18 are strong enough that together they can support bearing assembly 14 and the associated weight of cylinder 12. Yet plates 18 are resilient enough that they can flex to accommodate a longitudinal expansion of cylinder 12, and then return to their original position as cylinder 12 longitudinally contracts back to its original state upon cooling during inoperation. Plates 18 can be formed of fiberglass, metal, or any other material with a suitable combination of strength and resilience. Although plates 18 are shown as being substantially planar sheets, they can take on many different shapes. For instance, various forms of a spring or springs can serve the function of plates 18 as well.

Fixed rigid support 22 fixedly supports bearing assembly 16. In contrast to plates 18 and bearing assembly 14, support 22 holds bearing assembly 16 substantially immovable. Rigid support 22 can also be replaced by a flexible support substantially identical to plates 18. Although fixed structure 20 and fixed rigid support 22 are shown as being separate, they can also be parts of a common fixed structure.

A hot fluid supply pipe 24 is in fluid communication with fluid passage 32 of drying cylinder 12. The temperature and/or pressure of the steam which is supplied through fluid supply pipe 24 to drying cylinder 12 may be closely controlled. For example, the temperature may be increased and the pressure decreased within drying cylinder 12 to produce super-heated steam which is transported through fluid passage 32 thereof. The super-heated steam may increase the operating temperature of outer surface 36 of drying cylinder 12 to increase the drying capacity of cylinder 12. Contrarily, the temperature of the steam may be decreased and the pressure within fluid passage 32 increased to produce a certain amount of condensate 52 within fluid passage 32 of drying cylinder 12. The operating temperature at outer surface 36 of drying cylinder 12 is thus decreased, thereby decreasing the heat transfer rate to the paper web and the drying capacity of drying cylinder 12. Thus, by changing the temperature and/or pressure of the steam which is transported through drying cylinder 12, the drying capacity of drying cylinder 12 may be controlled. Varying the drying capacity of drying cylinder 12 may assist in controlling latent curl within the paper web.

In operation, the heating of drying cylinder 12 causes a longitudinal thermal expansion of cylinder 12 in the direction of longitudinal axis 30. The positions of longitudinal end 26 of cylinder 12, plates 18 and hot fluid supply pipe 24 after such a longitudinal expansion are indicated by the dashed lines of FIG. 1. As cylinder 12 expands longitudinally, longitudinal end 28 is maintained at a fixed distance 42 from bearing assembly 16, which is held immovable by fixed rigid support 22. Thus, longitudinal end 28 is also substantially immovable, and the full extent of the longitudinal thermal expansion of cylinder 12 is reflected in the change in position of longitudinal end 26. Since bearing assembly 14 is maintained at a fixed distance 42 from longitudinal end 26, bearing assembly 14 undergoes a corresponding change in position. Upper ends 44 of plates 18 are rigidly attached to bearing assembly 14, so they too must follow the change in position of bearing assembly 14. Since lower ends 48 of plates 18 are rigidly attached to a fixed structure 20, some bending or flexing must occur between upper ends 44 and lower ends 48 in plates 18 to accommodate the change in position of upper ends 44. As cylinder 12 cools down and longitudinally thermally contracts, plates 18 return to their original generally planar state.

Since the paper web primarily includes fibers and water, the operating temperature of drying cylinder 12 should in a broad sense be maintained below the combustion temperature of dry paper at ambient pressure, i.e., about 451° F. Thus, the maximum operating temperature of drying cylinder 12 is approximately 450° F. The coefficient of thermal expansion for steel is about $8.9 \times 10^{-6}$ inch/(inch ° F.). Given that at room temperature (approximately 70° F.) the length of drying cylinder 12 is approximately 400 inches, the longitudinal expansion as cylinder 12 rises from 70° F. to 450° F. is approximately equal to:

$$\frac{8.9 * 10^{-6} \text{in.}}{\text{in.} * °F.} * 400 \text{ in.} * (450° F. - 70° F.) = 1.35 \text{ inch.}$$

In the embodiment shown, fixed structure 20 is mounted on a floor with elongate flexible plates 18 extending down from bearing assembly 14 and being rigidly mounted to fixed structure 20. However, it is to be understood that elongate flexible plates 18 could instead be hung from and rigidly attached to another fixed structure located above bearing assembly 14. In this case, flexible plates 18 would extend up from bearing assembly 14 to the fixed structure located above. Bearing assembly 14 could also be rigidly attached to a fixed structure which is displaced horizontally or in substantially any other direction from bearing assembly 14.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A paper making machine for the production of a fiber material web, comprising:

a drying cylinder having two longitudinal ends, a longitudinal axis, and at least one fluid passage for receiving heated fluid, said drying cylinder being expandable in a direction substantially parallel to said longitudinal axis upon heating;

first and second bearing assemblies, each said bearing assembly attached to and rotatably carrying a respective said longitudinal end of said drying cylinder, said first bearing assembly including two opposite sides;

a fixed rigid support substantially immovably supporting said second bearing assembly;

a fixed structure; and at least one flexible, resilient, elongate plate having a longitudinal direction extending transverse to said longitudinal axis of said drying cylinder, each said at least one flexible, resilient, elongate plate having an upper end and a lower end, each said upper end of said at least one flexible, resilient, elongate plate being rigidly connected to a respective said opposite side of said first bearing assembly, each said lower end of said at least one flexible, resilient, elongate plate being rigidly connected to said fixed structure, each said at least one flexible, resilient, elongate plate configured for bending such that said upper end follows said first bearing assembly as said drying cylinder expands upon heating and said lower end remains fixed.

2. The paper making machine of claim 1, wherein said at least one flexible, resilient, elongate plate comprises two flexible, resilient, elongate plates.

3. The paper machine of claim 1, wherein said at least one flexible, resilient, elongate plate is comprised of fiberglass.

4. The paper making machine of claim 1, wherein said at least one flexible, resilient, elongate plate is comprised of metal.

5. The paper machine of claim 1, wherein each said bearing assembly is disposed a fixed distance from a corresponding said end of said drying cylinder.

6. The paper machine of claim 1, further comprising a hot fluid supply pipe in fluid communication with said at least one fluid passage, said hot fluid supply pipe configured for supplying a hot fluid to heat said drying cylinder.

7. The paper machine of claim 1, wherein said drying cylinder includes a pair of shafts, each said shaft connected with and extending from a respective said longitudinal end, each said shaft interconnecting a respective one of said bearing assemblies with a corresponding one of said drying cylinder ends.

8. The paper machine of claim 1, wherein said at least one fluid passage extends through each said longitudinal end of said drying cylinder.

9. The paper making machine of claim 1, wherein said first bearing assembly includes a non-self-aligning bearing.

10. A paper making machine for the production of a fiber material web, comprising:

a drying cylinder having two longitudinal ends, a longitudinal axis and at least one fluid passage for receiving heated fluid, said drying cylinder having a longitudinal thermal expansion in a direction parallel to said longitudinal axis of said drying cylinder;

first and second bearing assemblies, each said bearing assembly attached to and rotatably carrying a respective said longitudinal end of said drying cylinder, said first bearing assembly including two opposite sides;

a fixed rigid support substantially immovably supporting said second bearing assembly;

a fixed structure; and two elongate plates having longitudinal directions extending transverse to said longitudinal axis of said drying cylinder, each said elongate plate having an upper end and a lower end, each said upper end of said elongate plates being rigidly connected to a respective said opposite side of said first bearing assembly, each said lower end of said elongate plates being rigidly connected to said fixed structure, each said plate being a flexible, resilient plate.

11. A paper making machine for the production of a fiber material web, comprising:

a drying cylinder having two longitudinal ends, a longitudinal axis and at least one fluid passage for receiving heated fluid, said drying cylinder having a longitudinal thermal expansion in a direction parallel to said longitudinal axis of said drying cylinder;

first and second bearing assemblies, each said bearing assembly attached to and rotatably carrying a respective said longitudinal end of said drying cylinder, said first bearing assembly including two opposite sides;

a fixed rigid support substantially immovably supporting said second bearing assembly;

a fixed structure; and two elongate plates having longitudinal directions extending transverse to said longitudinal axis of said drying cylinder, each said elongate plate having an upper end and a lower end, each said upper end of said elongate plates being rigidly connected to a respective said opposite side of said first bearing assembly, each said lower end of said elongate plates being rigidly connected to said fixed structure, each said plate being a flexible, resilient plate made of fiberglass.

* * * * *